(12) United States Patent
Han et al.

(10) Patent No.: US 11,477,706 B2
(45) Date of Patent: Oct. 18, 2022

(54) METHOD AND APPARATUS FOR MEASUREMENT REPORT TRIGGERING

(71) Applicant: LENOVO (BEIJING) LIMITED, Beijing (CN)

(72) Inventors: Jing Han, Beijing (CN); Jie Hu, Beijing (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 9 days.

(21) Appl. No.: 15/734,678

(22) PCT Filed: May 23, 2018

(86) PCT No.: PCT/CN2018/088037
§ 371 (c)(1),
(2) Date: Dec. 3, 2020

(87) PCT Pub. No.: WO2019/222942
PCT Pub. Date: Nov. 28, 2019

(65) Prior Publication Data
US 2021/0360492 A1    Nov. 18, 2021

(51) Int. Cl.
*H04W 4/00* (2018.01)
*H04W 36/00* (2009.01)
*H04W 24/10* (2009.01)
*H04W 36/30* (2009.01)

(52) U.S. Cl.
CPC ....... *H04W 36/0058* (2018.08); *H04W 24/10* (2013.01); *H04W 36/00835* (2018.08); *H04W 36/30* (2013.01)

(58) Field of Classification Search
CPC ............. H04W 36/0058; H04W 24/10; H04W 36/00835; H04W 36/30; H04W 36/00837; H04W 36/0094

USPC ........................................................ 370/331
See application file for complete search history.

(56) References Cited

U.S. PATENT DOCUMENTS

| 8,060,153 | B2 * | 11/2011 | Jeong | ................ H04W 52/0216 |
| | | | | 455/574 |
| 11,102,668 | B2 * | 8/2021 | Takahashi | ............. H04W 24/10 |
| 2011/0195706 | A1 * | 8/2011 | Nakamori | ............. H04W 24/10 |
| | | | | 455/423 |

(Continued)

FOREIGN PATENT DOCUMENTS

| CN | 101860927 A | 10/2010 |
| CN | 104486784 A | 4/2015 |

OTHER PUBLICATIONS

PCT/CN2018/088037, "International Search Report and the Written Opinion of the International Search Authority" ISA/CN, National Intellectual Property Administration, Office of the PRC China, dated Jan. 22, 2019, pp. 1-7.

*Primary Examiner* — Amancio Gonzalez
(74) *Attorney, Agent, or Firm* — Kunzler Bean & Adamson

(57) ABSTRACT

Method and apparatus for measurement report triggering are disclosed. One method of UE such as aerial vehicles includes determining whether to transmit a measurement report according to a counter for a number of the neighbor cells with signal strength fulfilling a condition indicated by a network equipment; and transmitting the measurement report to the network equipment including information of the neighbor cells, in the case that the counter is larger than or equal with a threshold.

17 Claims, 8 Drawing Sheets

(56) References Cited

U.S. PATENT DOCUMENTS

| | | | |
|---|---|---|---|
| 2012/0015657 A1* | 1/2012 | Comsa | H04L 5/0055 455/456.6 |
| 2013/0288742 A1 | 10/2013 | Yae et al. | |
| 2015/0271713 A1* | 9/2015 | Kim | H04W 72/04 455/437 |
| 2017/0064576 A1* | 3/2017 | Kusashima | H04L 5/0073 |
| 2017/0127330 A1* | 5/2017 | Payyappilly | H04W 36/0085 |
| 2018/0332492 A1* | 11/2018 | Wang | H04W 24/10 |
| 2020/0033849 A1* | 1/2020 | Yiu | G05D 1/0022 |
| 2020/0154326 A1* | 5/2020 | Deenoo | H04W 36/08 |
| 2020/0187033 A1* | 6/2020 | Tang | H04W 36/0085 |
| 2020/0205062 A1* | 6/2020 | Azizi | H04W 48/10 |
| 2020/0260307 A1* | 8/2020 | Han | H04B 17/336 |
| 2020/0383029 A1* | 12/2020 | Takeda | H04W 36/0094 |
| 2020/0396654 A1* | 12/2020 | Freda | H04W 36/08 |
| 2021/0168670 A1* | 6/2021 | Min | H04W 36/0058 |
| 2021/0168725 A1* | 6/2021 | Muruganathan | H04W 52/283 |

\* cited by examiner

METHOD AND APPARATUS FOR MEASUREMENT REPORT TRIGGERING

FIELD

The subject matter disclosed herein relates generally to wireless communication and more particularly relates to measurement report triggering.

BACKGROUND

The following abbreviations and acronyms are herewith defined, at least some of which are referred to within the following description.

Third Generation Partnership Project ("3GPP"), Downlink ("DL"). Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Information Element ("IE"), Long Term Evolution ("LTE"), LTE Advanced ("LTE-A"), Master Information Block ("MIB"), Machine Type Communication ("MTC"), Radio Resource Control ("RRC"), Resource Reservation Field ("RRF"), Reference Signal Receiving Power ("RSRP"), Reference Signal Receiving Quality ("RSRQ"), Reference Signal Strength Indicator ("RSSI"), Receive ("RX"), System Information Block ("SIB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UNITS"), Vehicle-to-Vehicle ("V2V") and Vehicle-to-Everything ("V2X").

There have been an increased interests in communications between aerial vehicles such as drones and cellular networks. The use cases of commercial drones include package delivery, search-and-rescue, monitoring of critical infrastructure, wildlife conservation, flying cameras, and surveillance. All these use cases are growing rapidly and expected to emerge more in coming years. Many of these use cases could benefit from communications between drones and a cellular network. LTE and/or next generation thereof, which is known as 5G, are well positioned to serve aerial vehicles such as drones. In fact, there have been increased number of field trials involving the use of an LTE network to provide connectivity to drones. It is predicted that a rapid and vast growth in the drone industry will bring promising business opportunities to wireless operators. To meet the market demands, a new work item referred as "New WID (Working Item Description) on Enhanced LTE Support for Aerial Vehicles" has been approved by 3GPP. Particularly, enhancements to the existing measurement reporting mechanisms are required, including enhancements on trigger conditions for measurement report.

Particularly, an aerial UE such as a drone can detect more neighbor cells having strong interference thereon than a ground UE such as a cell phone, due to more lines of sight between the neighbor cells and the aerial UE. Thus an enhancement on the measurement report triggering is required for the aerial UE, so that the network equipment can learn the wireless environment the aerial UE located in thoroughly. In another aspect, the number of neighbor cells, which the aerial UE can detect, should be controlled in order to save the processing capability and power of the aerial UE.

BRIEF SUMMARY

Learning signal strength of neighbor cells can be used to improve mobility performance of an aerial U E, which requires the aerial UE to transmit a measurement report including information of the neighbor cells to the network equipment such as eNB. eNB can then assist in the mobility management of the aerial UE utilizing the received measurement report, for example, by optimizing a handover process. However, the aerial UE can detect much more neighbor cells than the legacy ground UE due to less obstructions between the aerial UE and the cells. Thus a legacy mechanism for triggering a measurement report is required to be enhanced with regard to an aerial UE to enable enough but limited number of neighbor cells with influential signal power to be transmitted in the measurement report.

Method and apparatus for measurement report triggering are disclosed. One method proposed for an aerial UE for measurement report triggering includes determining whether to transmit a measurement report according to a counter for a number of the neighbor cells with a signal strength fulfilling a condition indicated by a network equipment; and transmitting the measurement report to the network equipment including information of the neighbor cells, in the case that the counter is larger than or equal with a threshold.

Further, the threshold is a first pre-configured number and the method further comprises determining to transmit the measurement report according to the counter being larger than or equal with the first pre-configured number before a first timer expires.

Further, the threshold is a second pre-configured number and the method further comprises determining to transmit a measurement report according to the counter being larger than or equal with the second pre-configured number, with a time interval that the signal strength of the neighbor cells fulfills the condition in a serial sequence being not larger than a second timer.

In another aspect, one or more of the first pre-configured number, the first timer, the second pre-configured number, the second timer, the condition, entering condition and leaving condition are indicated by the network equipment, for example an eNB, to the UE such as aerial UEs.

The method and apparatus herein do not only provide a mechanism for the UE such as the aerial UE to report to the network equipment such as eNB about the interference detected from neighbor cells, but also to enable a limited but sufficient number of neighbor cells with influential signal power to be transmitted in a measurement report in a timely manner. Thus, the method and apparatus herein contribute to enhancements on measurement report triggering as well as power consumption of the aerial UEs.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to be limiting in scope, the embodiments will be described and explained with additional specificity and detail through the use of the accompanying drawings, in which.

DETAILED DESCRIPTION

Figure 1:
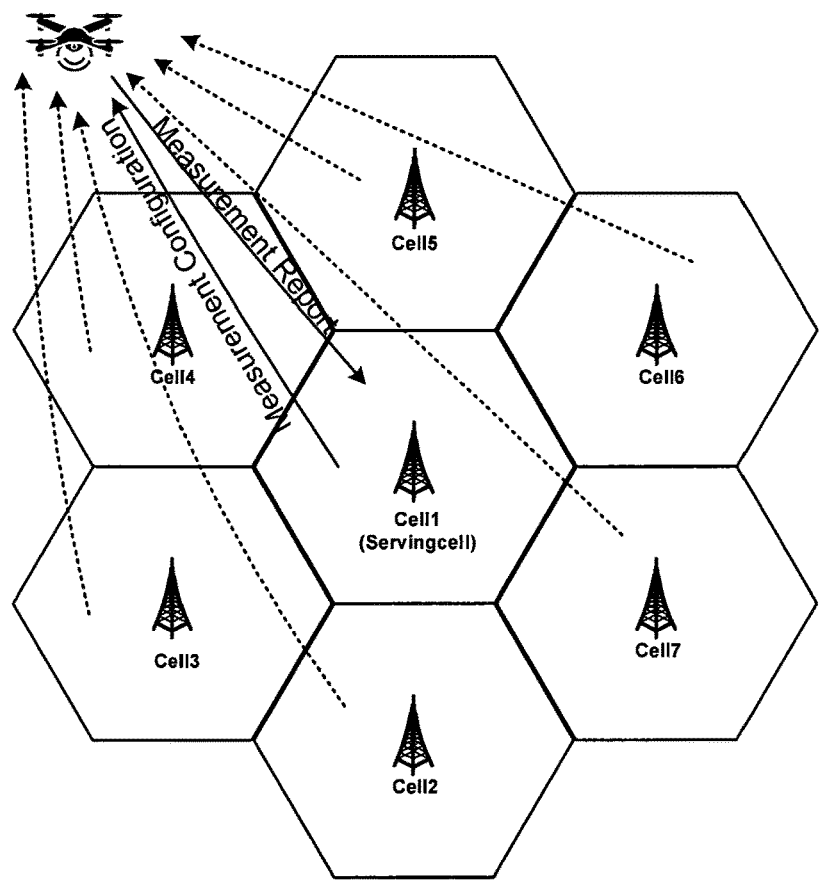
FIG. 1 is a schematic diagram illustrating measurement of signals from cells by an aerial UE.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancements of a mechanism for measurement report transmission from an aerial UE should be studied to timely notify the network equipment such as eNB about the interference from neighbor cells, in order to enable efficient mobility management for the aerial UE. The measurement report is triggered by the aerial UE in the case that a pre-configured number of neighbor cells have signal strength fulfilling a condition indicated by the eNB within a limited period. In one embodiment, the period is a pre-configured time interval during which the signal strength of a pre-configured number of neighbor cells are required to fulfill the condition. In another embodiment, the period can be reflected by a product of the pre-configured number of neighbor cells and a pre-configured time interval during which the signal strength of two neighbor cells are required to fulfill the condition in a serial sequence.

It should be understood that the terms aerial UE and aerial vehicle can be used alternatively in the present application. In addition, the term network equipment includes but is not limited to, the eNB.

FIG. 1 is a schematic diagram illustrating measurement of signals from cells by an aerial vehicle. As shown in FIG. 1, cell 1 is a serving cell for an aerial vehicle, which communicates with the aerial vehicle on the downlink (DL) and the uplink (UL) channels. Cells 2-7 are neighbor cells of cell 1, which produce interference on the communication channel between the aerial vehicle and the serving cell thereof. As shown in FIG. 1, the aerial vehicle receives a measurement configuration from an eNB managing cell 1 on a DL channel, and transmits a measurement report to the eNB on an UL channel. The aerial vehicle monitors the signal strength of neighbor cells, for example, based on broadcast signaling thereof. The signal strength can be indicated by RSRP, RSRQ or RSSI based on a reference signal.

It should be understood that the number of neighbor cells is not limited to 6 cells as shown in FIG. 1. Particularly, an aerial UE can detect more neighbor cells having strong interference thereon than a ground UE, due to more lines of sight between the neighbor cells and the aerial U E.

Figure 2:
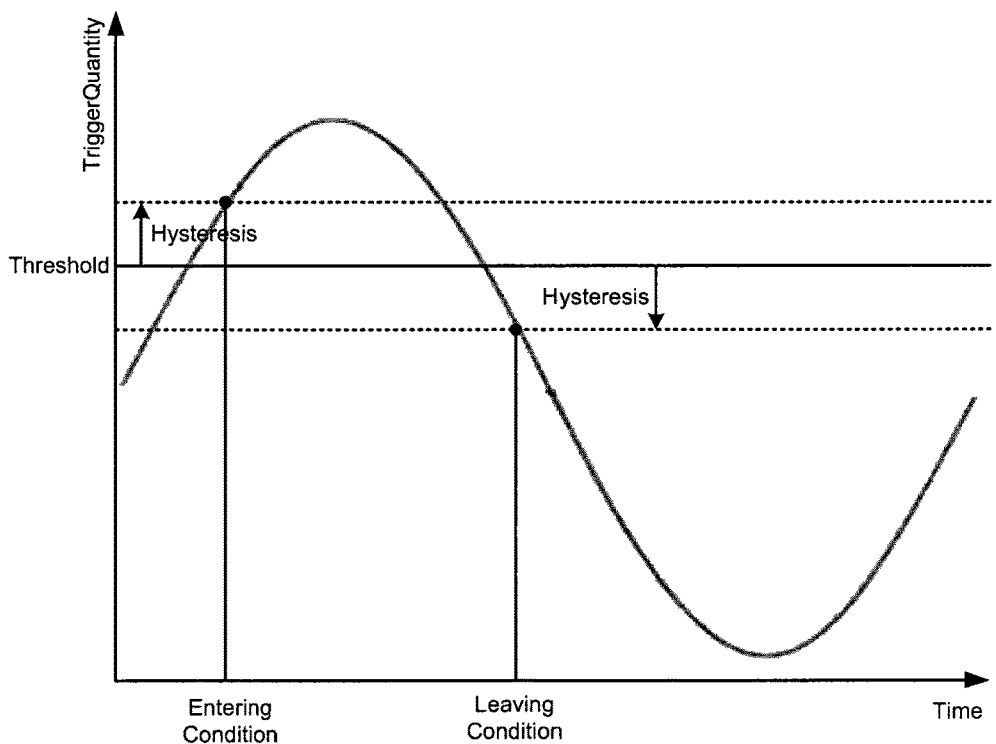
FIG. 2 is a schematic diagram illustrating an entering condition and leaving condition for measurement report transmission.

FIG. 2 is a schematic diagram illustrating both entering and leaving conditions for measurement report transmission. As shown in FIG. 2, the signal strength of a neighbor cell detected by a UE, which is referred as trigger quantity (e.g. the "TriggerQuantity") in FIG. 2, varies with time. With regard to a ground UE such as a cell phone, in the case that the TriggerQuantity is above a value usually indicated by a sum of a Threshold value and a Hysteresis value, a measurement report is triggered from the UE, which is referred to as the signal strength of a neighbor cell fulfilling an entering condition. On the contrary, in the case that a TriggerQuantity is below a value usually indicated by a subtraction of the Hysteresis value from the Threshold value, transmission of the measurement report may be discarded, which is referred to as the signal strength of a neighbor cell fulfilling a leaving condition. Alternatively, a last measurement report indicating that the signal strength of a neighbor cell fulfills the leaving condition may be transmitted. However, with regard to an aerial UE, more neighbor cells with influential interference may be detected, therefore it's necessary to design a mechanism for triggering a measurement report so that a pre-configured number of neighbor cells with signal strength fulfilling the entering condition will be included in the measurement report in a timely manner.

Two separate implementations for triggering a measurement report from an aerial UE are proposed in the present application, one of which is based on a first timer during which signal strength of a pre-configured number of neighbor cells are required to fulfill a condition for triggering a measurement report, the other is based on a second timer during which the signal strength of two neighbor cells are required to fulfill the condition in a serial sequence. FIGS. 3-8 are call flows illustrating different embodiments of the two solutions in details.

Implementation 1: a measurement report is transmitted according to a counter value associated with a number of the neighbor cells being larger than or equal with a first pre-configured number before a first timer expires.

Figure 3:
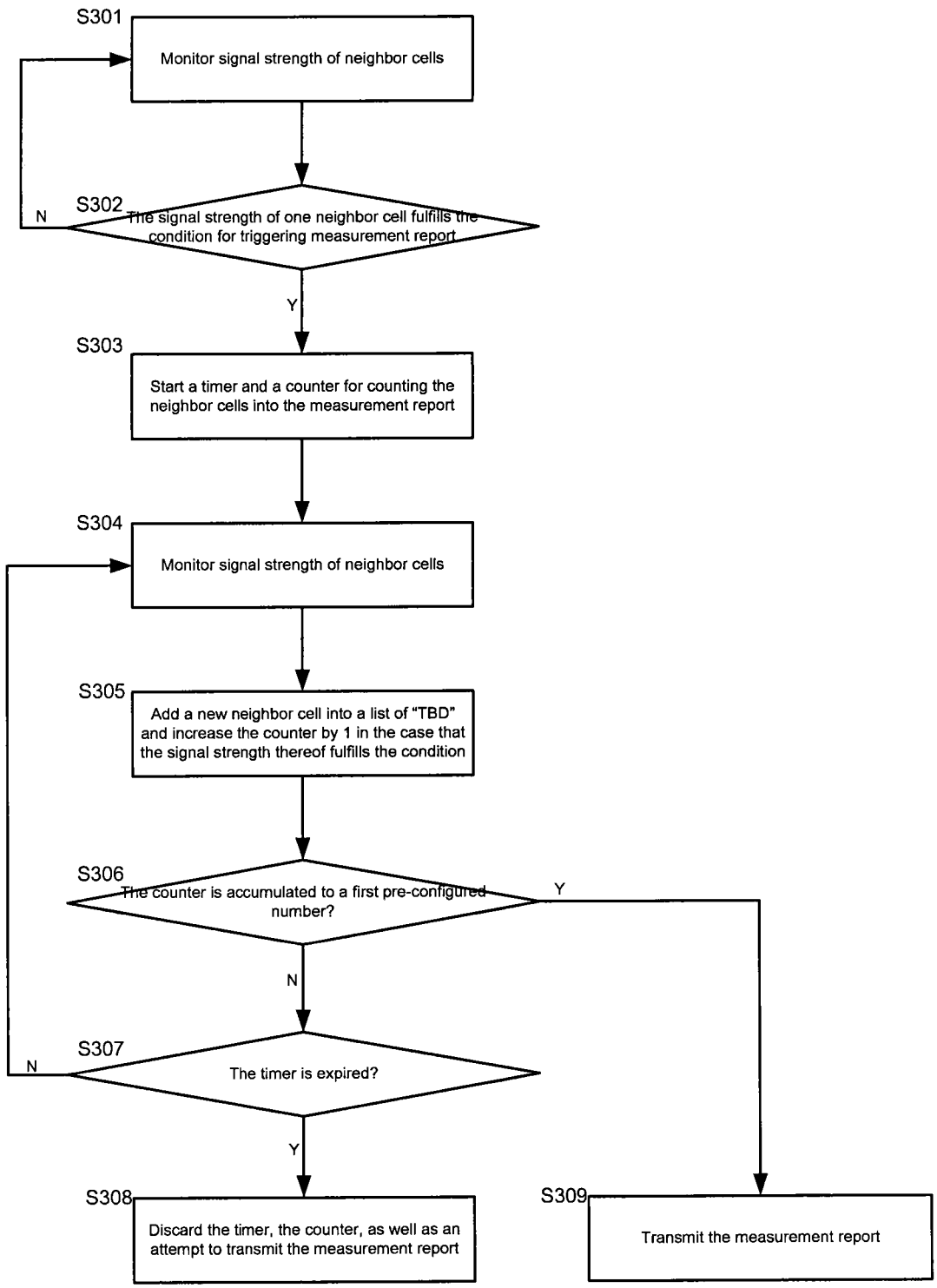
FIG. 3 is a call flow illustrating that transmission of measurement report according to a first embodiment.

FIG. 3 is a call flow illustrating transmission of measurement report according to a first embodiment. As shown in FIG. 3, in step S301, the aerial UE monitors signal strength of neighbor cells according to a measurement configuration received from a network equipment such as eNB, which will be described in details below. Particularly, the measurement configuration may indicate a profile for the measurement items associated with the neighbor cells and may indicate a measurement event including conditions for triggering the measurement report. In one embodiment, the measurement event is event A3 for indicating an offset value of RSRP-RSRQ used for triggering a measurement report, by which signal strength detected from a neighbor cell becomes better than that of a serving cell. In another embodiment, the measurement event is event A4 for indicating a threshold value of RSRP/RSRQ for triggering the measurement report, which the signal strength of a neighbor cell is better than.

In step S302, the aerial UE determines whether the signal strength of one neighbor cell fulfills the condition for triggering measurement report. As mentioned above, the condition such as an offset value of RSRP/RSRQ or a threshold value RSRP/RSRQ is included in the measurement configuration from the eNB. In the case that the signal strength of the one neighbor cell does not fulfill the condition specified, for example the signal strength thereof is lower than a threshold value of RSRP/RSRQ, the procedure returns back to step S301 in which the aerial UE keeps monitoring the signal strength of neighbor cells. In the case that the signal strength of the one neighbor cell fulfills the condition, for example, the signal strength thereof is determined to be higher than the threshold value of RSRP/RSRQ, the procedure continues to step S303.

In step S303, the aerial UE starts a timer and a counter for counting the neighbor cells to be included in a transmitted measurement report. Particularly, a first pre-configured number and a first timer indicated in the measurement configuration from the eNB may be used as upper limits of the counter and the timer started by the aerial UE, respectively. In one embodiment, the initial value of the counter is 1.

In step S304, the aerial UE keeps monitoring the signal strength of neighbor cells with the timer running.

In step S305, in the case that the signal strength of a new neighbor cell fulfills the condition, the aerial UE increases the counter by 1 and adds the new neighbor cell to a list which includes the neighbor cells to be possibly included in the measurement report, which is also referred to as a list of "To-Be-Determined" (TBD) herein. As mentioned above, the condition may be an offset value of RSRP/RSRQ or a threshold value RSRP/RSRQ included in the measurement configuration from the eNB.

In step S306, the aerial UE determines whether the counter is accumulated to the first pre-configured value. If the counter reaches the first pre-configured number, the procedure continues to step S309, in which a measurement report including information of the neighbor cells, which are in the list of TBD and the signal strength of which fulfills the condition, is transmitted to the eNB. In one embodiment, the information of the neighbor cells includes the cell identifiers, RSRP values, and/or RSRQ values of the neighbor cells. It should be noted that the counter being accumulated to the first pre-configured number (or the second pre-configured number described hereinafter) implies the counter may be larger than or equal with the first pre-configured number herein, given that a few neighbor cells may have the signal strength fulfilling the condition (or the entering condition described hereinafter) almost simultaneously.

If the counter has not been accumulated to the first pre-configured number, the procedure continues to step S307, in which the aerial UE determines whether the timer is expired, that is, if the first timer is reached. If the timer is not expired, the procedure returns back to step S304, in which the aerial UE keeps monitoring the signal strength of neighbor cells. If the timer is expired, the procedure continues to step S308, in which the aerial UE discards the timer, the counter, as well as an attempt to transmit the measurement report. For example, the counter is set to be 0. That is, the aerial UE does not detect a first pre-configured number of neighbor cells with influential interference before the first timer expires.

In another embodiment, the number of neighbor cells with the signal strength fulfilling the condition can be counted to be transmitted in the measurement report irrespectively with the timer. That is, a counter for counting the neighbor cells into the measurement report is started without the timer in step S303, and the step 307 is correspondingly omitted. In this case. The aerial UE determines whether the counter is larger than or equal with the first pre-configured number in step S306. In the case that the counter is larger than or equal with the first pre-configured number in step S306, in step S309, the aerial UE includes the neighbor cells with the signal strength fulfilling the condition into an information element (IE) of cellsTriggeredList, for example, the aerial UE updates the IE of cellsTriggeredList with the list of TBD. Then the aerial UE transmits the measurement report to the eNB including information of the neighbor cells in the IE of cellsTriggeredList. In the case that the counter is less than the first pre-configured number in step S306, the procedure returns back to step S304, in which the aerial UE keeps monitoring the signal strength of neighbor cells.

In yet another embodiment that the number of neighbor cells with the signal strength fulfilling the condition can be counted to be transmitted in the measurement report irrespectively with the timer. Besides adding the neighbor cell with the signal strength fulfilling the condition into the list of TBD in step S305, the aerial U E includes this neighbor cell into the IE of cellsTriggeredList. Then the aerial UE determines whether a number of the neighbor cells in the IE of cellsTriggeredList is larger than or equal with the first pre-configured number in step S306, instead of determination of the counter related to the list of TBD. In the case that the number of the neighbor cells in the IE of cellsTriggeredList is larger than or equal with the first pre-configured number in step S306, the aerial UE transmits the measurement report to the eNB including information of the neighbor cells in the IE of cellsTriggeredList. Otherwise, the procedure returns back to step S304, in which the aerial UE keeps monitoring the signal strength of neighbor cells.

Figure 4:
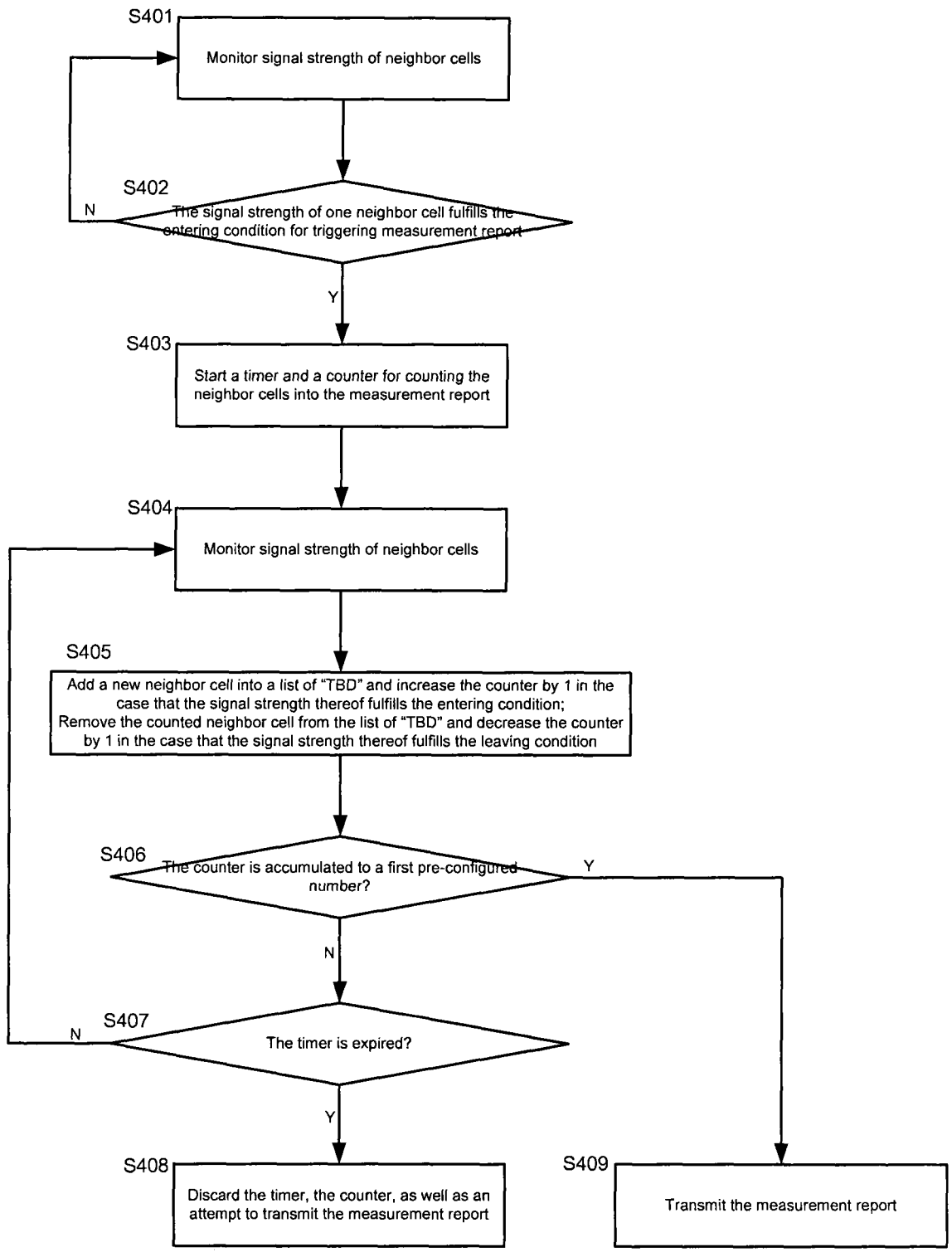
FIG. 4 is a call flow illustrating that transmission of measurement report according to a second embodiment.

FIG. 4 is a call flow illustrating that transmission of measurement report according to a second embodiment. As shown in FIG. 4, steps S401-S404 are similar to steps S301-S304 in FIG. 3 and therefore, the descriptions of steps S401-S404 is omitted for the purpose of brevity and concision. The enhancements of procedure depicted in FIG. 4 against the procedure described in FIG. 3 is that entering condition and a leaving condition are considered to determine the inclusion of the neighbor cells in the measurement report.

In step S405, in the case that the signal strength of a new neighbor cell fulfills the entering condition, the aerial UE increases the counter by 1 and adds the new neighbor cell into the list of TBD. Further, in case that the signal strength of a counted neighbor cell, which has been previously added to the list of TBD, fulfills the leaving condition, the aerial LE decreases the counter by 1 and remove the counted neighbor cell from the list of TBD. That is, the list of TBD is dynamically updated according to signal strength of neighbor cells before the timer expires. In one embodiment, in the case that the signal strength of the new neighbor cell is higher than the first threshold value of RSRP/RSRQ indicated by the eNB, or, alternatively, the difference between the signal strength of the new neighbor cell and that of the serving cell is higher than the first offset value of RSRP/RSRQ indicated by the eNB, the new neighbor cell is added to the list of TB). That is, the new neighbor cell may be included into the measurement report. In another aspect, in the case that the signal strength of the accounted neighbor cell is lower than the second threshold value of RSRP/RSRQ indicated by the eNB, alternatively, the difference between the signal strength of the accounted neighbor cell and that of the serving cell is lower than the second offset value of RSRP/RSRQ indicated by the eNB, the accounted neighbor cell is removed from the list of TBD. That is, the accounted neighbor cell may not be included into the measurement report. It should be understood that the first threshold value and the first offset value are higher than the second threshold value and the second offset value respectively. That is, a higher value as the entering condition is required to consider the influence from a neighbor cell, while a lower value as the leaving condition is required to ignore the influence from the neighbor cell.

As shown in FIG. 4, the steps S406-S409 thereof are similar with steps S306-S309 in FIG. 3, thereof the descriptions of steps S406-S409 are omitted for the purpose of brevity and concision.

In another embodiment, the number of neighbor cells can be counted to be transmitted in the measurement report irrespectively with the timer. That is, a counter for counting the neighbor cells into the measurement report is started without the timer in step S403, and the step 407 is correspondingly omitted. In this case, the aerial LIE determines whether the counter is larger than or equal with the first pre-configured number in step S406. In the case that the counter is larger than or equal with the first pre-configured number in step S406, in step S409, the aerial LE includes the neighbor cells with the signal strength fulfilling the entering condition into an information element (IE) of cellsTriggeredList, for example, the aerial UE updates the IE of cellsTriggeredList with the list of TBD. Then the aerial UE transmits the measurement report to the eNB including information of the neighbor cells in the IE of cellsTriggeredList. In the case that the counter is less than the first pre-configured number in step S406, the procedure returns back to step S404, in which the aerial UE keeps monitoring the signal strength of neighbor cells.

In yet another embodiment that the number of neighbor cells can be counted to be transmitted in the measurement report irrespectively with the timer. In step S405, besides adding the neighbor cell with the signal strength fulfilling the entering condition into the list of TBD, the aerial UE includes this neighbor cell into the IE of cellsTriggeredList. Similarly, in step S405, besides removing the counted neighbor cell with the signal strength fulfilling the leaving condition from the list of TBD, the aerial UE excludes this neighbor cell from the IE of cellsTriggeredList. Then the aerial UE determines whether a number of the neighbor cells in the IE of cellsTriggeredList is larger than or equal with the first pre-configured number in step S406, instead of determination of the counter related to the list of TBD. In the case that the number of the neighbor cells in the IE of cellsTriggeredList is larger than or equal with the first pre-configured number in step S406, the aerial UE transmits the measurement report to the eNB including information of the neighbor cells in the IE of cellsTriggeredList. Otherwise, the procedure returns back to step S404, in which the aerial U E keeps monitoring the signal strength of neighbor cells.

Figure 5:
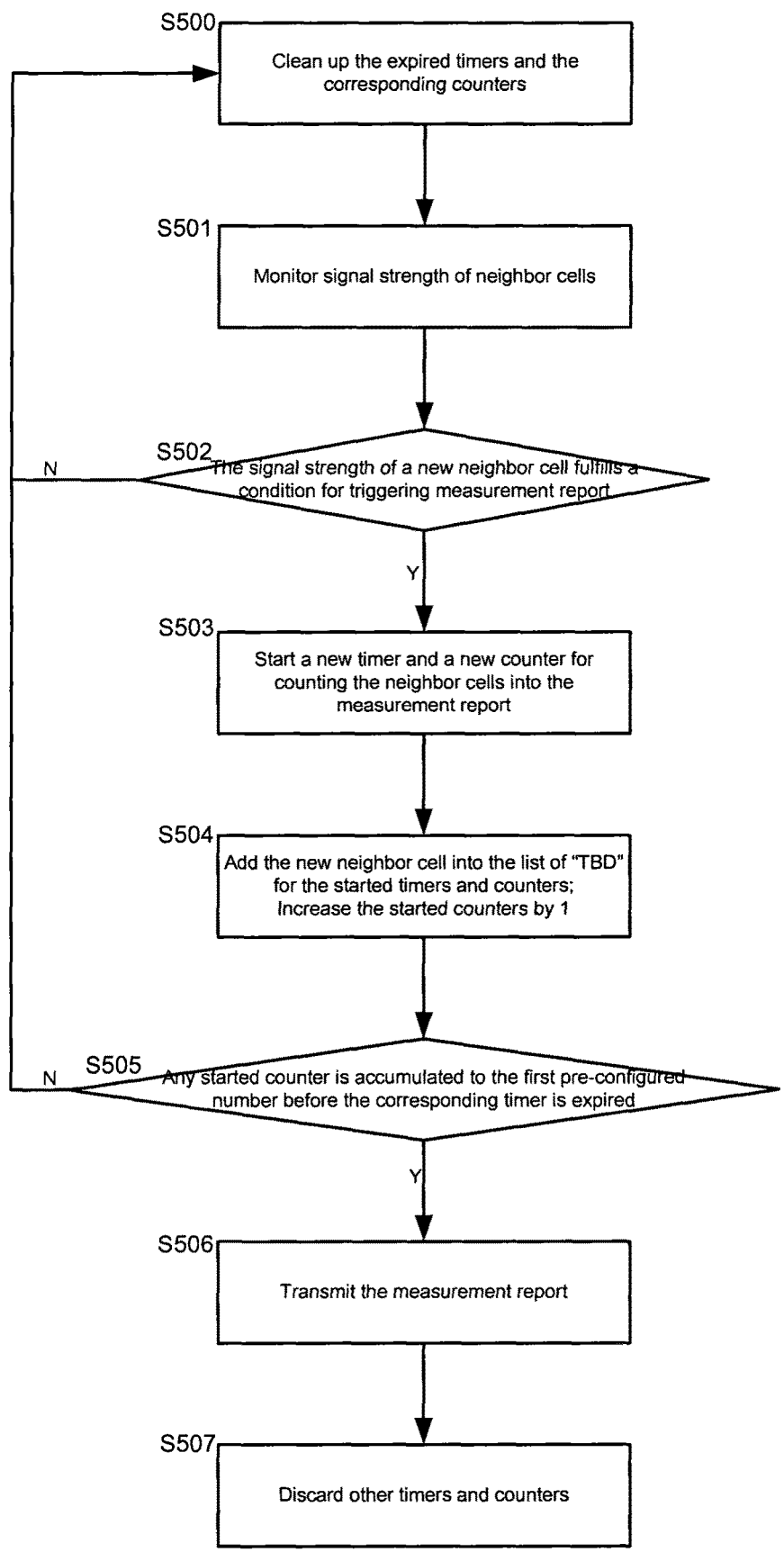
FIG. 5 is a call flow illustrating that transmission of measurement report according to a third embodiment.

FIG. 5 is a call flow illustrating transmission of measurement report according to a third embodiment in which independent counters and timers are created for each neighbor cell having a signal strength fulfilling the condition. Therefore, as shown in FIG. 5, in step S500, the aerial UE cleans up the expired timers and corresponding counters for associated neighbor cells, if there are the expired timers. It should be noted that the determination and the following clearance of the expired timers and the corresponding counters may be performed as an intermediate step or in a period manner. In one embodiment, the determination and the following clearance may be performed following step S502 which will be described hereinafter. That is, the sequence of step S500 is not limited to be in front of step S501, and the purpose of the step S500 is to clean a cache of the aerial UE occupied by the set of expired timers, the corresponding counters as well as the associated list of TBD in an efficient way.

In step S501, the aerial UE monitors signal strength of neighbor cells according to a measurement configuration from the eNB.

In step S502, the aerial UE determines whether the signal strength of a new neighbor cell fulfills a condition for triggering measurement report. As mentioned above, the condition such as an offset value of RSRP/RSRQ or a threshold value RSRP/RSRQ is included in the measurement configuration from the eNB. In the case that the signal strength of the neighbor cell does not fulfill the measurement condition, for example the signal strength thereof is lower than a threshold value of RSRP/RSRQ, the procedure returns back to step S500 and then S501 in which the aerial UE keep monitoring the signal strength of neighbor cells. In the case that the signal strength of the neighbor cell fulfills the condition, for example the signal strength thereof is higher than the threshold value of RSRP/RSRQ, the procedure continues to step S503.

In step S503, the aerial UE starts a new timer and a new counter for counting the neighbor cells into the measurement report. That is, a counter and a timer are started independently for each neighbor cell with a signal strength fulfilling the condition indicated by the eNB. Particularly, a first pre-configured number and a first timer indicated in the measurement configuration from the eNB may be used as upper limits of the counter and the timer started by the aerial UE, respectively. In one embodiment, the initial value of the counter is 0.

In step S504, the aerial UE adds the new neighbor cell into the list of TBD for the started timers and counters and increases the started counters by 1.

In step S505, the aerial UE checks whether any started counter is accumulated to the first pre-configured number before the corresponding timer is expired. That is, assuming N neighbour cells with the signal strength fulfilling the condition have been detected, correspondingly N counters have been started, then the aerial UE needs to check if any of the N counters is accumulated to the first pre-configured number before the corresponding timer has expired. In the case that none of the started counters is accumulated to the first pre-configured number, the procedure returns back to step S500 and then S501, in which the aerial UE keep monitoring the signal strength of the neighbor cells. On the contrary, in the case that one of the started counters is accumulated to the first pre-configured number, the procedure continues to step S506.

An instance is illustrated to explains the processing in steps S502-S505 in details. Assuming that the aerial UE detects that cell 2 as a neighbor cell (as shown in FIG. 1) has the signal strength fulfilling the condition in step S502, the aerial UE starts a timer and a counter associated with cell 2 in step S503, as well as adds cell 2 into the list of TBD associated with cell 2 and increases the counter associated with cell 2 by 1 in step S504. Later, the aerial UE determines that the started counter associated with cell 2 is not accumulated to the first pre-configured number before the corresponding timer is expired in step S505, then the aerial UE continues to monitor the signal strength of neighbor cells in step S501, and detects that cell 3 as a neighbor cell (as shown in FIG. 1) has the signal strength fulfilling the condition in step S502. That is, the aerial UE starts a new timer and a new counter associated with cell 3 in step S503, as well as adds cell 3 into both the list of TBD associated with cell 3 and the list of TBD associated with cell 2, and increases both the counter associated with cell 3 and the counter associated with cell 2 by 1 in step S504. At this point, the aerial UE maintains two sets of the counter and the timer, one set associated with neighbor cell 2 and the other with the neighbor cell 3.

In step S506, if one of the started counters has been accumulated to the first pre-configured number in step S505, the measurement report including information of the first pre-configured number of the neighbor cells, which are in the list of TBD and the signal strength of which fulfills the condition, is transmitted to the eNB. In one embodiment, the information of the neighbor cells includes the cell identifiers, RSRP values, and/or RSRQ values of the neighbor cells.

In step S507, the aerial UE discards other timers and counters, even the other timers have not been expired yet, in order to save UL resource and processing capacity of the aerial UE. For example, other counters are set to be 0. In one embodiment, the aerial UE identifies that different sets of timers and counters may belong to a same attempt for transmission of the measurement report, according to that the different sets being related to a same identifier such as an information element ("IE") of measID. In another embodiment, in the case that the measurement report associated with certain started timer is triggered, the aerial UE discards other timers, duration of which are covered by a pre-configured period, as well as the corresponding counters.

In another embodiment, the number of neighbor cells with the signal strength fulfilling the condition can be counted to be transmitted in the measurement report irrespectively with the timer. That is, the counters for counting the neighbor cells into the measurement report is started without the timers in step S503. In this case, the aerial UE determines whether any started counter is larger than or equal with the first pre-configured number in step S505. In the case that one of the counters is larger than or equal with the first pre-configured number in step S505, in step S506, the aerial UE updates the IE of cellsTriggeredList with the list of TBD which is corresponding to the counter larger than or equal with the first pre-configured number firstly. Then the aerial IE transmits the measurement report to the eNB including information of the neighbor cells in the IE of cellsTriggeredList. In the case that none of the counters is larger than or equal with the first pre-configured number in step S505, the procedure returns back to step S501, in which the aerial UE keeps monitoring the signal strength of neighbor cells.

Figure 6:
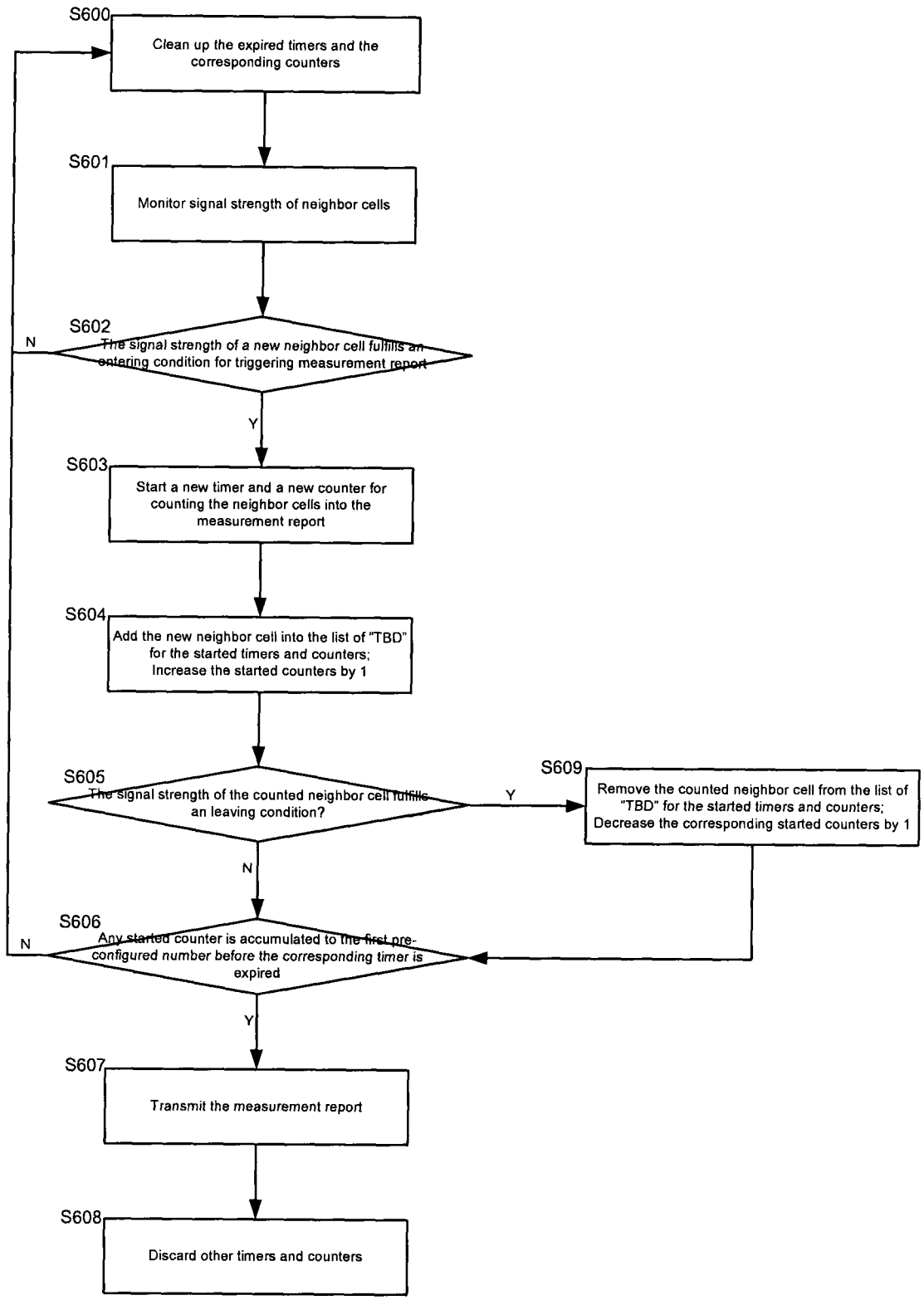
FIG. 6 is a call flow illustrating that transmission of measurement report according to a fourth embodiment.

FIG. 6 is a call flow illustrating that transmission of measurement report according to a fourth embodiment. As shown in FIG. 6, the steps S600-S604 are similar with steps S500-S504 in FIG. 5, thereof the descriptions of steps S600-S604 are omitted for the purpose of brevity and concision. The enhancements of procedure in FIG. 6 against the procedure in FIG. 5 is that, an entering condition and a leaving condition are considered to determine the inclusion of the neighbor cells in the measurement report.

In step S605, the aerial UE determines whether the signal strength of a counted neighbor cell fulfills the leaving condition. If the leaving condition is not fulfilled in step S605, the procedure continues to step S606, in which the aerial UE determines whether any started counter is accumulated to the first pre-configured number before the corresponding timer is expired. If the leaving condition is fulfilled in step S605, the procedure continues to step S609, in which the aerial UE removes the counted neighbor cell with the signal strength fulfilling the leaving condition from the list of "TBD" for the started timers and counters, and decreases the corresponding started counters by 1. And then the procedure continues to step S606.

In one embodiment, the entering condition is defined as a first threshold value of RSRP/RSRQ, and the neighbor cells should have the signal strength higher than the first threshold value of RSRP/RSRQ to be included in the list of TIM. On the contrary, the leaving condition is defined as a second threshold value of RSRP/RSRQ, and the counted neighbor cells with the signal strength lower than the second threshold value of RSRP/RSRQ will be removed from the list of TBD. In another embodiment, the entering condition is defined as a first offset value of RSRP/RSRQ, and the difference between the signal strength of the neighbor cell and that of the serving cell should be larger than the first offset value of RSRP/RSRQ to be included in the list of TBD. On the contrary, the leaving condition is defined as a second offset value of RSRP/RSRQ, and the counted neighbor cells will be removed from the list of TBD in the case that the difference between the signal strength thereof and that of the serving cell is lower than the first offset value of RSRP/RSRQ. It should be understood that the first threshold value and the first offset value are higher than the second threshold value and the second offset value respectively. That is, a higher value as the entering condition is required to consider the influence from a neighbor cell, while a lower value as the leaving condition is required to ignore the influence from the neighbor cell.

An instance is illustrated to explains the processing in steps S605 and S609 in details. Assuming a few sets of counters and timers, as well as a few corresponding lists of TBD are created independently, and cell 2 has been counted into some lists of TBD through steps S601-S604. If the aerial UE detects that the signal strength of cell 2 fulfills the leaving condition in step S605, the cell 2 is removed from the lists of TBD containing it, and the counters corresponding to the lists of TBD is decreased by 1 in step S609.

In step S606, the aerial UE determines whether any of the started counter is accumulated to the first pre-configured number. If the counter reaches the first pre-configured number, the procedure continues to step S607, in which a measurement report including information of the neighbor cells, which are in the list of TBD and the signal strength of which fulfills the condition, is transmitted to the eNB. In one embodiment, the information of the neighbor cells includes the cell identifiers, RSRP values, and/or RSRQ values of the neighbor cells.

Alternatively, in the case that more than one counter as well as the corresponding lists of TBD enable the transmission of the measurement report, in order to alleviate the processing complexity for the aerial UE to select the list of TBD to be included in the measurement report, the aerial UE may select the list of TBD with the timer which is started firstly. In another embodiment, the aerial UE may randomly selects one from the lists of TBD, in which signal strength of a first pre-configured number of the neighbor cells fulfills the entering condition before the corresponding timer is expired, to be included in the measurement report in step S607. In yet another embodiment, in the case that one of the counted neighbor cells has the signal strength fulfilling the leaving condition before the first timer is expired, the aerial UE may discard the counter, which is started for the one of the counted neighbor cells with the signal strength fulfilling the leaving condition, the corresponding timer and the list of TBD, as well as decreases other counters by one in step S609.

As shown in FIG. 6, the steps S607-S608 thereof are similar with steps S506-S507 in FIG. 5, thereof the descriptions of steps S607-S608 are omitted for the purpose of brevity and concision.

In another embodiment, the number of neighbor cells with the signal strength fulfilling the condition can be counted to be transmitted in the measurement report irrespectively with the timer. That is, the counters for counting the neighbor cells into the measurement report is started without the timers in step S603. In this case, the aerial UE determines whether any started counter is larger than or equal with the first pre-configured number in step S606. In the case that one of the counters is larger than or equal with the first pre-configured number in step S606, in step S607, the aerial UE updates the IE of cellsTriggeredList with the list of TBD which is corresponding to the counter larger than or equal with the first pre-configured number firstly. Then the aerial UE transmits the measurement report to the eNB including information of the neighbor cells in the IE of cellsTrig-geredList. In the case that none of the counters is larger than or equal with the first pre-configured number in step S606, the procedure returns back to step S601, in which the aerial UE keeps monitoring the signal strength of neighbor cells.

Implementation 2: a measurement report is transmitted according to the counter value associated with a number of the neighbor cells being accumulated to a second pre-configured number with a time interval that the signal strength of the neighbor cells fulfills the condition in a serial sequence being not larger than a second timer.

Figure 7:
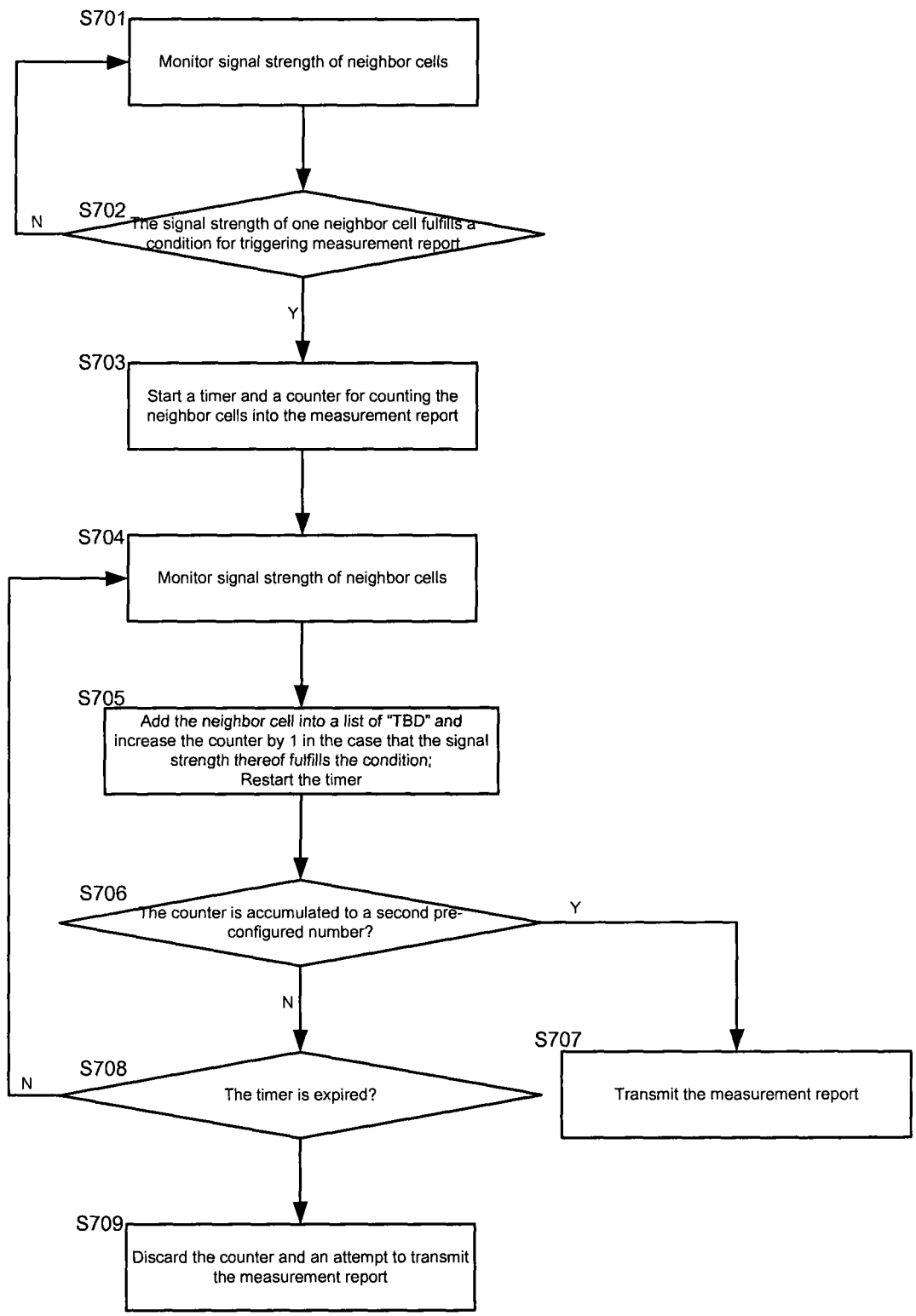
FIG. 7 is a call flow illustrating that transmission of measurement report according to a fifth embodiment.

FIG. 7 is a call flow illustrating that transmission of measurement report according to a fifth embodiment. As shown in FIG. 7, in step S701, the aerial UE monitors signal strength of neighbor cells according to a measurement configuration from the eNB.

In step S702, the aerial UE determines whether the signal strength of a new neighbor cell fulfills a condition for triggering measurement report. As mentioned above, the condition such as an offset value of RSRP/RSRQ or a threshold value RSRP/RSRQ is included in the measurement configuration from the eNB. In the case that the signal strength of the neighbor cell does not fulfill the condition, for example the signal strength thereof is lower than a threshold value of RSRP/RSRQ, the procedure returns back to step S701 in which the aerial UE keep monitoring the signal strength of neighbor cells. In the case that the signal strength of the neighbor cell fulfills the condition, for example the signal strength thereof is higher than the threshold value of RSRP/RSRQ, the procedure continues to step S703.

In step S703, the aerial UE starts a timer and a counter for counting the neighbor cells into the measurement report. Particularly, a second pre-configured number and a second timer indicated in the measurement configuration from the eNB may be used as upper limits of the counter and the timer started by the aerial UE, respectively. In one embodiment, the initial value of the counter is 1. Different with the first timer defined in the first embodiment illustrated in FIG. 3, the second timer is defined as a upper limit of the time interval that the signal strength of the neighbor cells fulfills the condition in a serial sequence.

In step S704, the aerial UE keeps monitoring the signal strength of neighbor cells with the timer running.

In step S705, in the case that the signal strength of a new neighbor cell fulfills the condition, the aerial UE increases the counter by 1 and adds the new neighbor cell into the list of TBD. As mentioned above, the condition may be an offset value of RSRP/RSRQ or a threshold value RSRP/RSRQ included in the measurement configuration from the eNB. Further, the aerial UE restarts the timer due to the addition of the new neighbor cells into the list of TBD. That is, the timer is restarted in a window sliding manner in the case that a new neighbor cell with the signal strength fulfilling the condition is detected.

In step S706, the aerial UE determines whether the counter is accumulated to the second pre-configured number. If the counter reaches the second pre-configured number, the procedure continues to step S707, in which a measurement report including information of the neighbor cells, included in the list of TBD and the signal strength of which fulfills the condition, is transmitted to the eNB. In one embodiment, the information of the neighbor cells includes the cell identifiers, RSRP values, and/or RSRQ values of the neighbor cells.

If the counter has not been accumulated to the second pre-configured number, the procedure continues to step S708, in which the aerial UE determines whether the timer is expired, that is, if the second timer is reached. If the timer is not expired, the procedure returns back to step S704, in which the aerial UE keeps monitoring the signal strength of neighbor cells. If the timer is expired, the procedure continues to step S709, in which the aerial UE discards the counter, as well as an attempt to transmit the measurement report. For example, the counter is set to be 0. That is, the aerial IE does not detect a second pre-configured number of neighbor cells having influential interference, with a time interval that the signal strength of the neighbor cells fulfills the condition in a serial sequence being not larger than a second timer.

Figure 8:
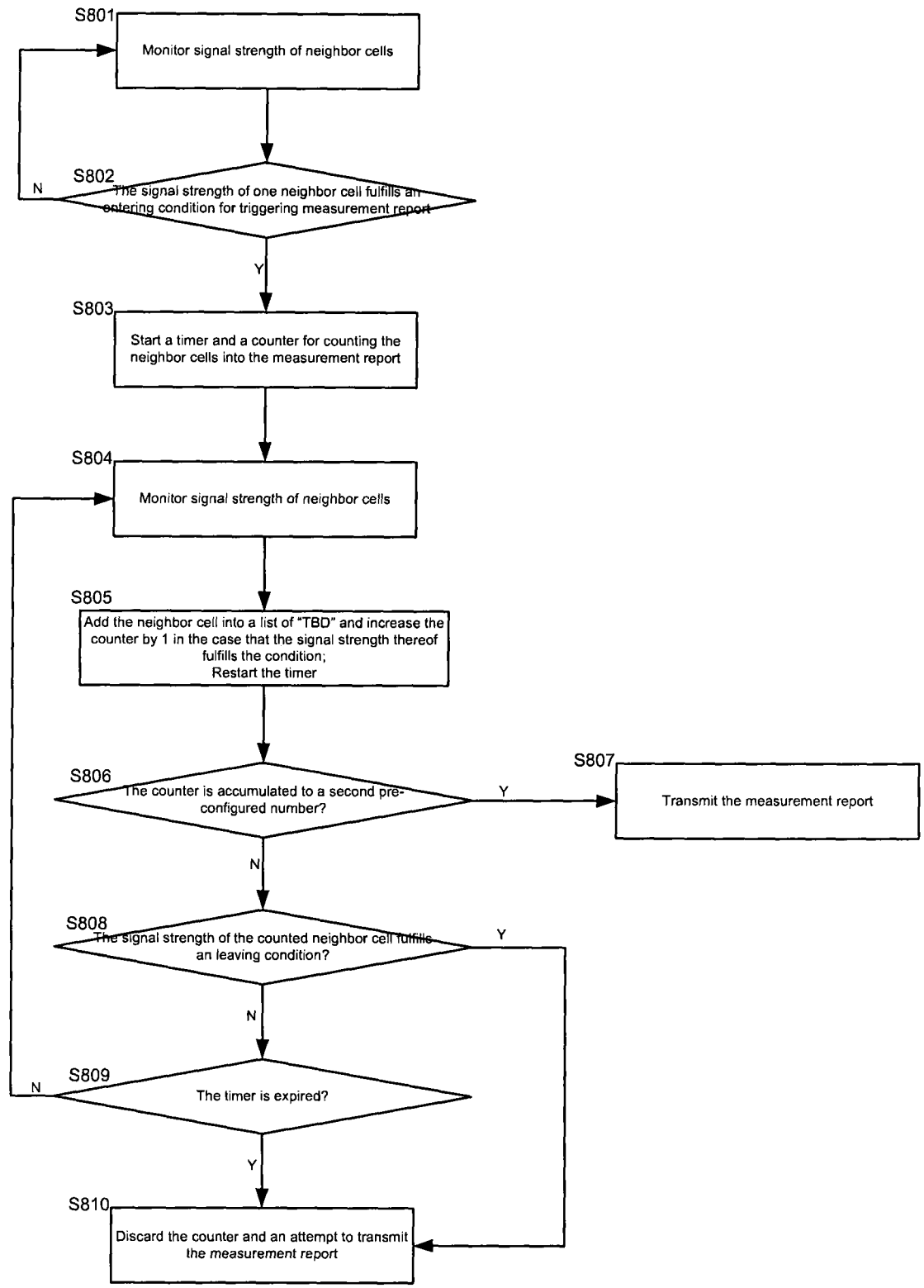
FIG. 8 is a call flow illustrating that transmission of measurement report according to a sixth embodiment.

FIG. 8 is a call flow illustrating that transmission of measurement report according to a sixth embodiment. As shown in FIG. 8, the steps S801-S807 thereof are similar with steps S701-S707 in FIG. 7, thereof the descriptions of steps S801-S807 are omitted for the purpose of brevity and concision. The enhancements of procedure in FIG. 8 against the procedure in FIG. 7 is that, an entering condition and a leaving condition are considered to determine the inclusion of the neighbor cells in the measurement report.

In step S808, the aerial UE determines whether the signal strength of one of the counted neighbor cells fulfills the leaving condition. If it is true in step S808, the procedure continues to step S810, in which the aerial UE discards the timer, the counter, as well as an attempt to transmit the measurement report. For example, the counter is set to be 0. If it is false in step S808, the procedure continues to step S809, in which the aerial UE determines whether the timer is expired.

In one embodiment, the entering condition is defined as a first threshold value of RSRP/RSRQ, and the neighbor cells should have the signal strength higher than the first threshold value of RSRP/RSRQ to be included in the list of TBD. On the contrary, the leaving condition is defined as a second threshold value of RSRP/RSRQ, and the attempt to transmit the measurement will be discarded in the case that one of the counted neighbor cells has the signal strength lower than the second threshold value of RSRP/RSRQ. In another embodiment, the entering condition is defined as a first offset value of RSRP/RSRQ, and the difference between the signal strength of the neighbor cell and that of the serving cell should be larger than the first offset value of RSRP/RSRQ to be included in the list of TI. On the contrary, the leaving condition is defined as a second offset value of RSRP/RSRQ, and the attempt to transmit the measurement report will be discarded in the case that the difference between the signal strength of one of the neighbor cells and that of the serving cell is lower than the first offset value of RSRP/RSRQ. It should be understood that the first threshold value and the first offset value are higher than the second threshold value and the second offset value respectively. That is, a higher value as the entering condition is required to consider the influence from a neighbor cell, while a lower value as the leaving condition is required to ignore the influence from the neighbor cell.

An instance is illustrated to explains the processing in steps S808 in details. Assuming that a counter is created and a timer are running, with a few neighbor cells in the list of TBD through steps S801-S805. If the aerial UE detects that the signal strength of one of the counted cells fulfills the leaving condition for triggering the measurement report in step S808, both the counter and the timer are stopped even the timer has not been expired against the second timer indicated by the eNB, and further, the attempt to transmit the measurement report will be discarded.

As shown in FIG. 8, the steps S809-S810 thereof are similar with steps S708-S709 in FIG. 7, thereof the descriptions of steps S809-S810 are omitted for the purpose of brevity and concision.

It should be understood that the measurement configuration is received from the network equipment, including one or more of the first pre-configured number, the first timer, the second pre-configured number, the second timer, the condition, the entering condition and the leaving condition. Further, the first pre-configured number may be same with the second pre-configured number.

One skilled in the relevant art will recognize, however, that the process described in FIGS. 3-8 is unnecessary to be practiced in the sequence shown in the Figures, and are able to be practiced without one or more of the specific steps, or with other steps not shown in the Figures.

Figure 9:
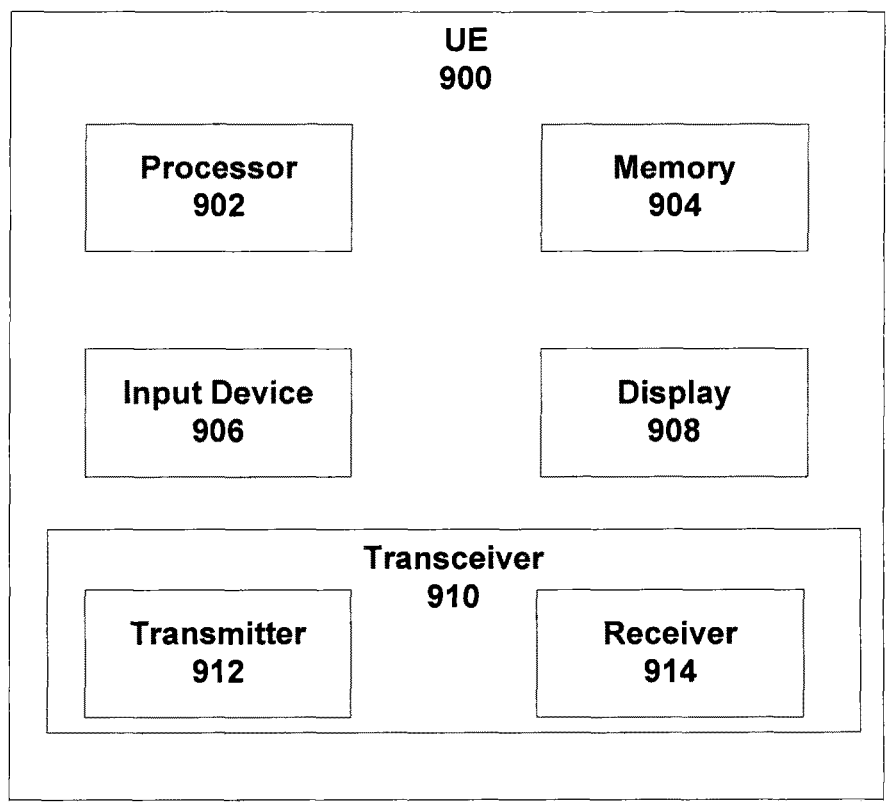
FIG. 9 is a schematic block diagram illustrating components of a UE such as aerial UE according to one embodiment.

FIG. 9 is a schematic block diagram illustrating components of a UE such as aerial vehicle according to one embodiment.

UE900 is an embodiment of the aerial vehicle described from FIG. 1 to FIG. 8. Furthermore, UE 900 may include a processor 902, a memory 904, and a transceiver 910. In some embodiments, IE 900 may include an input device 906 and/or a display 908. In certain embodiments, the input device 906 and the display 908 may be combined into a single device, such as a touch screen.

The processor 902, in one embodiment, may include any known controller capable of executing computer-readable instructions and/or capable of performing logical operations. For example, the processor 902 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 902 executes instructions stored in the memory 904 to perform the methods and routines described herein. The processor 902 is communicatively coupled to the memory 904, the input device 906, the display 908, and the transceiver 910.

In some embodiments, the processor 902 controls the transceiver 910 to transmit a measurement report including information of neighbor cells to Network Equipment 1000 and/or receive a measurement configuration from Network Equipment 1000. In certain embodiments, the processor 902 may monitor DL signals received via the transceiver 910 for specific messages.

The memory 904, in one embodiment, is a computer readable storage medium. In some embodiments, the memory 904 includes volatile computer storage media. For example, the memory 904 may include a RAM, including dynamic RAM ("DRAM"), synchronous dynamic RAM ("SDRAM"), and/or static RAM ("SRAM"). In some embodiments, the memory 904 includes non-volatile computer storage media. For example, the memory 904 may include a hard disk drive, a flash memory, or any other suitable non-volatile computer storage device. In some embodiments, the memory 904 includes both volatile and non-volatile computer storage media. In some embodiments, the memory 904 stores data relating to trigger conditions for transmitting the measurement report to Network Equipment 1000. In some embodiments, the memory 904 also stores program code and related data, such as an operating system or other controller algorithms operating on UE 900.

IE 900 may optionally include an input device 906. The input device 906, in one embodiment, may include any known computer input device including a touch panel, a button, a keyboard, a stylus, a microphone, or the like. In some embodiments, the input device 906 may be integrated with the display 908, for example, as a touch screen or similar touch-sensitive display. In some embodiments, the input device 906 includes a touch screen such that text may be input using a virtual keyboard displayed on the touch screen and/or by handwriting on the touch screen. In some embodiments, the input device 906 includes two or more different devices, such as a keyboard and a touch panel. In certain embodiments, the input device 906 may include one or more sensors for monitoring an environment of UE 900.

UE 900 may optionally include a display 908. The display 908, in one embodiment, may include any known electronically controllable display or display device. The display 908 may be designed to output visual, audible, and/or haptic signals. In some embodiments, the display 908 includes an electronic display capable of outputting visual data to a user. For example, the display 908 may include, but is not limited to, an LCD display, an LED display, an OLED display, a projector, or a similar display device capable of outputting images, text, or the like to a user. As another, non-limiting, example, the display 908 may include a wearable display such as a smart watch, smart glasses, a heads-up display, or the like. Further, the display 908 may be a component of a smart phone, a personal digital assistant, a television, a table computer, a notebook (laptop) computer, a personal computer, a vehicle dashboard, or the like.

In certain embodiments, the display 908 may include one or more speakers for producing sound. For example, the display 908 may produce an audible alert or notification (e.g., a beep or chime). In some embodiments, the display 908 includes one or more haptic devices for producing vibrations, motion, or other haptic feedback. In some embodiments, all or portions of the display 908 may be integrated with the input device 906. For example, the input device 906 and display 908 may form a touch screen or similar touch-sensitive display. In other embodiments, the display 908 may be located near the input device 906.

The transceiver 910, in one embodiment, is configured to communicate wirelessly with Network Equipment 1000. In certain embodiments, the transceiver 910 comprises a transmitter 912 and a receiver 914. The transmitter 912 is used to transmit UL communication signals to Network Equipment 1200 and the receiver 914 is used to receive DL communication signals from Network Equipment 1200. For example, the transmitter 912 may transmit a measurement report indicating information of neighbor cells. As another example, the receiver 914 may receive trigger conditions for transmitting the the measurement report from Network Equipment 1000.

The transmitter 912 and the receiver 914 may be any suitable types of transmitters and receivers. Although only one transmitter 912 and one receiver 914 are illustrated, the transceiver 910 may have any suitable number of transmitters 912 and receivers 914. For example, in some embodiments, UE 900 includes a plurality of transmitter 912 and receiver 914 pairs for communicating on a plurality of wireless networks and/or radio frequency bands, each transmitter 912 and receiver 914 pair configured to communicate on a different wireless network and/or radio frequency band than the other transmitter 912 and receiver 914 pairs.

Figure 10:
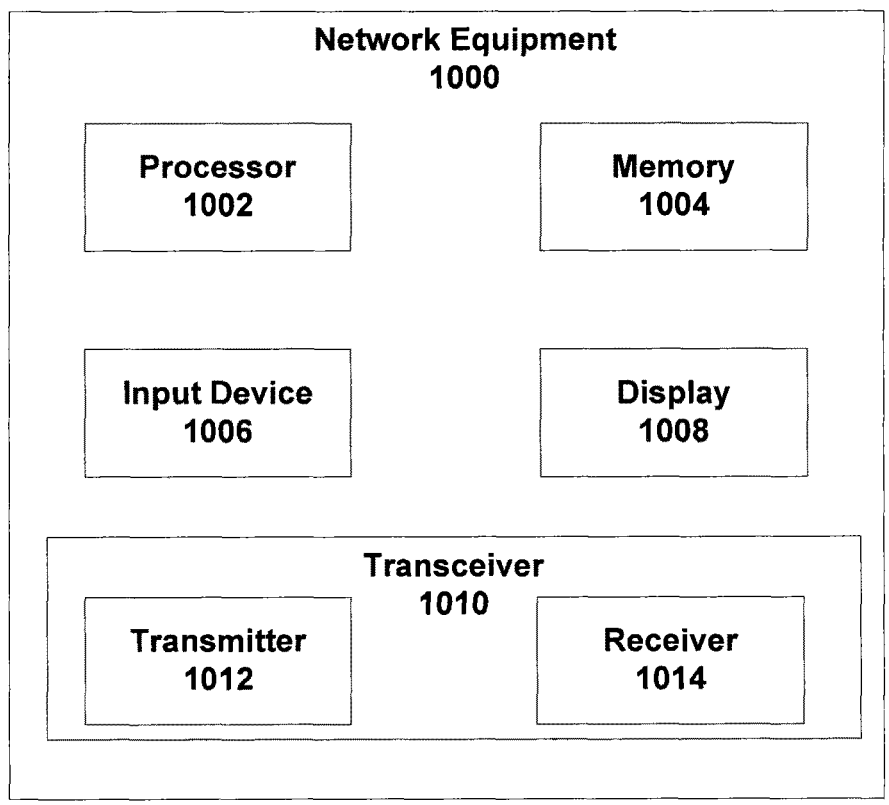
FIG. 10 is a schematic block diagram illustrating components of a network equipment according to one embodiment.

FIG. 10 is a schematic block diagram illustrating components of a network equipment according to one embodiment.

Network Equipment 1000 includes one embodiment of eNB described from FIG. 1 to FIG. 8. Furthermore, Network Equipment 1000 may include a processor 1002, a memory 1004, an input device 1006, a display 1008, and a transceiver 1010. As may be appreciated, the processor 1002, the memory 1004, the input device 1006, and the display 1008 may be substantially similar to the processor 1002, the memory 1004, the input device 1006, and the display 1008 of UE 900, respectively.

In some embodiments, the processor 1002 controls the transceiver 1010 to transmit DL signals to UE 1000. The processor 1002 may also control the transceiver 1010 to receive UL signals from UE 900. For example, the processor 1002 may control the transceiver 1010 to receive a measurement report indicating information of neighbor cells of UE 900. In another example, the processor 1002 may control the transceiver 1010 to transmit a DL signals for measurement configuration to UE 900, as described above.

The transceiver 1010, in one embodiment, is configured to communicate wirelessly with UE 900. In certain embodiments, the transceiver 1010 comprises a transmitter 1012 and a receiver 1014. The transmitter 1012 is used to transmit DL communication signals to UE 900 and the receiver 1014 is used to receive UL communication signals from UE 900. For example, the receivers 1014 may receive a measurement report from UE 900. As another example, the transmitter 1012 may transmit the measurement configuration of Network Equipment 1000.

The transceiver 1010 may communicate simultaneously with a plurality of UE 900. For example, the transmitter 1012 may transmit DL communication signals to UE 900. As another example, the receiver 1014 may simultaneously receive UL communication signals from UE 900. The transmitter 1012 and the receiver 1014 may be any suitable types of transmitters and receivers. Although only one transmitter 1012 and one receiver 1014 are illustrated, the transceiver 1010 may have any suitable number of transmitters 1012 and receivers 1014. For example, Network Equipment 1000 may serve multiple cells and/or cell sectors, wherein the transceiver 1010 includes a transmitter 1012 and a receiver 1014 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that determines whether to transmit a measurement report according to a counter for a number of neighbor cells with a signal strength fulfilling a condition indicated by a network equipment; and
a transceiver that transmits the measurement report to the network equipment including information of the neighbor cells in response to the counter being larger than or equal to a threshold, wherein:
the processor, in response to the counter being larger than or equal to the threshold, includes the neighbor cells with the signal strength fulfilling the condition into an information element (IE) of cellsTriggeredList; and
the transceiver transmits the measurement report to the network equipment including information of the neighbor cells in the IE of cellsTriggeredList.

2. The apparatus according to claim 1, wherein the threshold is a first pre-configured number, and the processor determines to transmit the measurement report in response to the counter being larger than or equal to the first pre-configured number before a first timer expires.

3. The apparatus according to claim 2, wherein the processor starts both the first timer and the counter for each of the neighbor cells with the signal strength fulfilling the condition.

4. The apparatus according to claim 3, wherein the processor, in response to the counter for one of the neighbor cells being larger than or equal to the first pre-configured number before the first timer for the one of the neighbor cells expires, discards both the first timer and the counter for other neighbor cells.

5. The apparatus according to claim 2, wherein the processor increases the counter by one in response to one of the neighbor cells having the signal strength fulfilling the condition before the first timer is expired.

6. The apparatus according to claim 2, wherein the condition includes an entering condition and a leaving condition, and the processor:
increases the counter by one in response to one of the neighbor cells having the signal strength fulfilling the entering condition before the first timer is expired; and
decreases the counter by one in response to one of the counted neighbor cells having the signal strength fulfilling the leaving condition before the first timer is expired.

7. The apparatus according to claim 6, wherein the processor, in response to one of the counted neighbor cells having the signal strength fulfilling the leaving condition before the first timer is expired, discards the counter started for the one of the counted neighbor cells, and decreases other counters by one.

8. The apparatus according to claim 1, wherein the threshold is a second pre-configured number, and the processor determines to transmit a measurement report according to the counter being larger than or equal to the second pre-configured number, with a time interval that the signal strength of the neighbor cells fulfills the condition in succession being not larger than a second timer.

9. The apparatus according to claim 8, wherein the processor increases the counter by one and restarts the second timer in response to one of the neighbor cells having the signal strength fulfilling the condition before the second timer expires.

10. The apparatus according to claim 9, wherein the processor discards the counter in response to none of the neighbor cells having the signal strength fulfilling the condition before the second timer expires.

11. The apparatus according to claim 8, wherein the condition includes an entering condition and a leaving condition, and the processor:
increases the counter by one and restarts the second timer in response to one of the neighbor cells having the signal strength fulfilling the entering condition before the second timer expires; and discards both the counter and the second timer in response to the counted neighbor cells having the signal strength fulfilling the leaving condition before the second timer expires.

12. The apparatus according to claim 1, wherein the transceiver receives a measurement configuration from the network equipment including a first pre-configured number, a first timer, a second pre-configured number, the second timer, the condition, an entering condition, a leaving condition, or some combination thereof.

13. A method comprising:
    determining whether to transmit a measurement report according to a counter for a number of a neighbor cells with a signal strength fulfilling a condition indicated by a network equipment; and
    transmitting the measurement report to the network equipment including information of the neighbor cells in response to the counter being larger than or equal to a threshold;
    including a neighbor cell into an IE of cellsTriggeredList in response to the signal strength of the neighbor cell fulfilling the condition; and
    transmitting the measurement report to the network equipment including information of the neighbor cells in the IE of cellsTriggeredList in response to a number of the neighbor cells in the IE of cellsTriggeredList being larger than or equal to the threshold.

14. The method according to claim 13, wherein the threshold is a first pre-configured number, and the method further comprises determining to transmit the measurement report in response to the counter being larger than or equal to the first pre-configured number before a first timer expires.

15. The method according to claim 14, further comprising starting both the first timer and the counter for each of the neighbor cells with the signal strength fulfilling the condition.

16. The method according to claim 15, further comprising, in response to the counter for one of the neighbor cells being larger than or equal to the first pre-configured number before the first timer for the one of the neighbor cells expires, discarding both the first timer and the counter for other neighbor cells.

17. An apparatus comprising:
    a transceiver that receives a measurement report from a user equipment including information of neighbor cells with a signal strength fulfilling a condition, wherein a number of the neighbor cells counted into the measurement report is larger than or equal with a threshold, and wherein:
        the condition includes an entering condition and a leaving condition; and
            a neighbor cell is included into an IE of cellsTriggeredList in response to the signal strength of the neighbor cell fulfilling the entering condition; or
            the neighbor cell is excluded from the IE of cellsTriggeredList in response to the signal strength of the neighbor cell fulfilling the leaving condition; and
    the measurement report includes information of the neighbor cells in the IE of cellsTriggeredList in response to a number of the neighbor cells in the IE of cellsTriggeredList being larger than or equal to the threshold.

* * * * *